United States Patent
Taylor

(10) Patent No.: US 6,828,376 B2
(45) Date of Patent: Dec. 7, 2004

(54) AQUEOUS COATING COMPOSITION GIVING COATINGS HAVING IMPROVED EARLY HARDNESS AND TACK-RESISTANCE

(75) Inventor: Philip L. Taylor, Burnham (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/842,613

(22) Filed: Apr. 26, 2001

(65) Prior Publication Data

US 2001/0034405 A1 Oct. 25, 2001

Related U.S. Application Data

(63) Continuation of application No. 09/232,110, filed on Jan. 15, 1999, which is a continuation of application No. 08/776,264, filed as application No. PCT/EP95/02821 on Jul. 14, 1995, now abandoned.

(30) Foreign Application Priority Data

Jul. 25, 1994 (GB) ............................................. 9414922

(51) Int. Cl.$^7$ ......................... C08L 73/00; C08G 63/66; B05D 5/00
(52) U.S. Cl. ....................... 524/501; 524/599; 524/845; 528/361; 427/256
(58) Field of Search ................................ 524/501, 599, 524/845; 528/361; 427/256

(56) References Cited

U.S. PATENT DOCUMENTS

| | | | |
|---|---|---|---|
| 4,016,306 A | * | 4/1977 | Miyagawa et al. |
| 5,451,456 A | * | 9/1995 | Marchessault et al. |
| 5,502,116 A | | 3/1996 | Noda |

FOREIGN PATENT DOCUMENTS

| | | |
|---|---|---|
| DE | 4 040 158 A | 6/1992 |
| DE | 4 212 801 A | 11/1992 |
| EP | 0 030 289 | 6/1981 |
| WO | WO 91/13207 * | 9/1991 |
| WO | WO 94/07940 A1 | 4/1994 |
| WO | WO 95/15260 | 6/1995 |
| WO | WO 96/24682 | 8/1996 |

OTHER PUBLICATIONS

De Konig, et al., "Biosynthesis of poly–(R)–3–hydroxyalkanoate: an emulsion polymerization," *Journal of Environmental Polymer Degradation* 1(3):223–226 (1993).

Denki Kagaku Kogyo, "Isolation and purification of polyhydroxy–alkanoate used as coating agent from microorganisms, using surfactant to control polyhydroxy–alkanoate in amorphous condition," STN International.

Lauzier, et al., "Form formation and paper coating with poly(beta–hydroxyalkanoate), a biodegradable latex," *TAPPI Journal* 76(5):71–77 (1993).

* cited by examiner

Primary Examiner—Tae H. Yoon
(74) Attorney, Agent, or Firm—Pabst Patent Group LLP

(57) ABSTRACT

An aqueous coating composition (especially a paint or varnish for buildings, vehicles, furniture and metal or plastics containers) which can form coatings on surfaces at ambient temperatures which on drying have improved early hardness and tack-resistance. The coating composition comprises water, optionally pigment and other conventional ingredients and dispersed particles of a highly non-crystalline polyester containing repeating hydroxyalkanoate units (preferably 3-hydroxybutyrate or 3-hydroxyvalerate or their copolymers). The polyester is non-crystalline to the extent that at least 60 wt % of the particles have a density of less than 102% of $D_{min}$ where $D_{min}$ is the minimum density attainable by the polyester. The composition may also contain conventional film-forming polymers of the types used in aqueous paint or varnish.

15 Claims, No Drawings

AQUEOUS COATING COMPOSITION GIVING COATINGS HAVING IMPROVED EARLY HARDNESS AND TACK-RESISTANCE

This application is a continuation of U.S. Ser. No. 09/232,110 filed Jan. 15, 1999, which is a continuation of U.S. Ser. No. 08/776,264 filed Mar. 24, 1997, now abandoned which is a 371 of International Application No. PCT/EP95/02821 filed Jul. 14, 1995, which claims priority to foreign application No. 9414922.6 filed Jul. 25, 1994 in the United Kingdom.

This invention relates to an aqueous coating composition which on application to a surface gives a coating which on drying has improved early hardness and tack-resistance. It especially relates to a paint or varnish of the type suitable for application at ambient temperatures (usually 0 to 40° C.) to surfaces found on buildings or vehicles or on their fittings or furnishings or on metal or plastics containers. This invention also relates to a method of painting and varnishing a building or vehicle or its fittings or furnishings or a metal or plastics container by applying the paint or varnish to a surface by means of a conventional decorating tool or technique such as a brush, roller, pad or spray. The invention further relates to the use of the paint or varnish in providing a coating supported on a non-fibrous surface, for example a surface provided by plaster, masonry, (including brick, stone or concrete), metal or plastics.

Aqueous paints or varnishes comprise a film-forming polymer (including copolymers) dispersed or dissolved in a so-called aqueous vehicle which comprises water and optionally also water-miscible organic solvents. One of the difficulties with aqueous paints or varnishes is the relative slowness with which a dried coat of the paint or varnish becomes fully hard and tack-resistant even after substantially all of the aqueous vehicle has been removed by evaporation. Any delay in achieving hardness increases the risk of the dried coating being damaged by scuffing or scoring. The lack of early tack-resistance means that opposed contiguous freshly painted surfaces are liable to stick together or "block", to use the British trade term. Opposed contiguous surfaces are found for example when a freshly painted door or window frame is closed against its freshly painted enclosing frame, or when freshly painted containers are packed together. Hence a lack of early tack-resistance delays the time when freshly painted doors and windows can be safely closed or when freshly painted containers can be packed.

It is known that the onset of hardness and tack-resistance can be accelerated by chemically cross-linking an unsaturated film-forming polymer. This occurs for example when traditional alkyd resins are autoxidised by atmospheric oxygen in the presence of an autoxidation promoter or "drying agent" such as cobalt octoate. The problem with autoxidation is that it continues (albeit slowly) throughout the life of the dried coat of paint and eventually increases hardness to such an extent that the coating becomes too brittle to withstand thermal expansion and contraction and so flakes off the painted surface. In addition, most of the film-forming polymers used commercially in aqueous paints suitable for application at ambient temperatures comprise polymerised acrylic or vinyl monomers containing no residual unsaturation after polymerisation so that cross-linking by autoxidation is not possible.

Aqueous latexes of either crystalline or moderately non-crystalline naturally occurring thermoplastic polyester particles obtainable from renewable agricultural feedstocks are known to form cohesive coatings on non-fibrous substrates if they are heated to temperatures of 100° C. of more. Such polyesters contain polyhydroxyalkanoates and are exemplified by copolymers of poly(3-hydroxy)butyrate (PHB) and poly(3-hydroxy)valerate (PHV). Similar biodegradable polyester of long-chain 3-hydroxyalkanoates and of 4- and 5-hydroxyalkanoates are also known. When all of the polyester particle is fully crystalline, the density of the polyester reaches its maximum which will be called the "crystalline density", $D_{max}$ of the polyester. Conversely, when all of the polyester particle is fully non-crystalline, the density of the polyester reaches its minimum which will be called the non-crystalline density of the polyester, $D_{min}$. If the particles are only partially crystalline, they will have an intermediate density lying between the non-crystalline and crystalline densities and the amount by which their density falls below $D_{max}$ (the crystalline density) is indicative of the amount of non-crystalline structure present in the polyester.

The polyesters may be produced microbially—via known micro-organism-induced fermentations of aqueous substrates as described for example in the article "Biopol Polyester" by J M Liddell in the book "The Chemical Industry—Friend to the Environment" edited by J A G Drake and published in 1992 by the Royal Society of Chemistry of London, see page 1 et seq. The contents of this article are herein incorporated by reference. The aqueous fermentation medium contains both nutrients and carbon source or sources which together support growth. The carbon sources also provide energy. Suitable micro-organisms include bacteria such as Bacillus megaterium, Cyanobacteria, Alcaligenes latus, Pseudomonas pseudoflava, Pseudomonas cepacia and preferably Pseudomonas oleovorans or Alcaligenes eutrophus. Alcaligenes eutrophus has the advantage of being ubiquitous in nature but it is only capable of forming polyesters whose repeating units contain 3 to 5 carbon atoms. Pseudomonas cepacia offers a much wider range of carbon chains. The nutrients should provide elements needed for cell multiplication such as nitrogen, phosphorous, sulphur, sodium, potassium, magnesium, calcium, zinc, iron and copper. The carbon sources may be carbohydrates such as starch, sucrose, and preferably glucose, or its salts, natural oils, alkanoic acids, preferably acetic, propionic or valeric (i.e. pentanoic) acids or alcohols such as methanol, ethanol, propanol or pentanol.

The fermentation is usually performed in two stages. Firstly, enough micro-organism is grown to provide a practicable concentration of the micro-organism. The amount grown is conveniently controllable by selecting an appropriate concentration of nutrient for use in the fermentation medium. On exhaustion of the nutrient, the organism ceases to grow and the second stage begins.

In the second stage of the fermentation, more carbon source is added to the substrate and the synthesis of the polyester either begins or more usually greatly accelerates. In nature, the polyester serves as a food store for the organism and it accumulates as discrete particles in the cytoplasm of the micro-organism.

A proportion of moderately non-crystalline polyester particles may be extracted as an aqueous dispersion from the micro-organism cells by a process such as that described in European Patent Specification EP 0 145 233A or its corresponding United States Patent Specification U.S. Pat. No. 4,910,145 (the contents of which are herein incorporated by reference) provided the process stops short of any oxidation treatment or of any attempt to separate the particles from the dispersion and dry them. Briefly a useful process comprises heating the aqueous suspension of cells obtained from the fermentation to at least 80° C. and the digesting the cells with proteolytic enzyme and/or surfactant which dissolves most of the non-polymeric cell material leaving the polyester as a dispersed particulate solid which can be recovered by filtration or centrifugation. The proteolytic enzyme may be for example at least one of pepsia, trypsia, bromelain, papain, ficin, rennin, chymotripsin or bacterial or fungal proteolytic enzymes. The surfactant may be an anionic surfactant such as a sulphated or sulphonated fatty acid and in particular it may be sodium dodecyl sulphate.

Unfortunately, coating compositions formed from aqueous dispersions of crystalline or moderately non-crystalline polyester particles do not form cohesive coatings on non-fibrous substrates at ambient temperatures (i.e. 0 to 40° C.) and so they are unsuitable for use in aqueous paints or varnishes of the type suitable for application to plaster, masonry, wooden or metal surfaces or any previously painted surfaces found on buildings or vehicles or their fittings or furnishings or on metal containers.

An object of the invention is to provide an aqueous coating composition which on application to a surface gives a coating which on drying has improved early hardness and tack-resistance without the need to rely on autoxidation.

Accordingly, this invention provides an aqueous coating composition (preferably an aqueous paint or varnish of the type suitable for application to surfaces of the type found on buildings or vehicles or their fittings or furnishings or on metal or plastics containers) wherein the coating composition comprises:

a) water
b) in the case of a paint, pigment
c) particles of polyester (including co-polyester) dispersed in water, which polyester contains repeating hydroxy alkanoate units and wherein at least 60 wt % of the polyester particles have a density of less than 102% of $D_{min}$ (and preferably less than 101% of $D_{min}$) which in effect means that the majority of polyester particles are highly non-crystalline with only a very small proportion of crystallinity being tolerable and
d) preferably conventional film-forming polymer in an amount of up to 95 wt % (preferably up to 85 wt %) of the combined weights of the conventional film-forming polymer and the polyester.

The presence of even small concentrations of highly non-crystalline hydroxyalkanoate polyester particles in a freshly dried coat of paint or vanrish have been found to accelerate hardening and achievement of increased tack-resistance. It is supposed that when the coating dries, crystallisation is initiated in the highly non-crystalline polyester particles leading to the formation of numerous crystalline zones or "crystallites" in which adjacent polyester chains are held together by lateral attractions which act like chemical crosslinks. Lateral attractions are well known in other crystalline polymers such as isotactic polypropylenes. Crystallisation can occur quite quickly and so the quasi-crosslinking effect and the consequent hardening and increase in tack-resistance are likewise quick.

Usually the aqueous paints or varnishes of this invention are particularly useful in decorating buildings where it is not practicable to heat the decorated surfaces to much above ambient temperatures and where non-fibrous surfaces are often encountered.

The hydroxyalkanoate repeating units may comprise for example a 3-hydroxyalkanoate or containing a 4- or 5-hydroxyalkanoate or combinations thereof. The general formula for the repeating unit of poly 3-hydroxyalkanoate is:

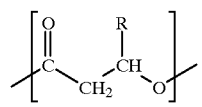

where R is $C_1$ to $C_{12}$ alkyl. For poly 3-hydroxybutyrate, R is $CH_3$ and for poly 3-hydroxyvalerate R is $C_2H_5$. $D_{min}$ (the non-cyrstalline density) for poly 3-hydroxybutyrate is about 1.18 g/cm³ so preferably 60 wt % of the poly 3-hydroxybutyrate particles used in this invention should have a density of less than 1.20 g/cm³. The general formula for the repeating unit of poly 4-hydroxyalkanoate is:

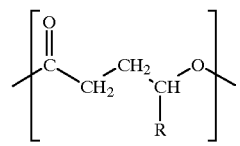

where R is a $C_1$ to $C_{12}$ hydrocarbon group, preferably alkyl.

Preferably, the polyester comprises a copolymer of 3-hydroxybutyrate and 3-hydroxyvalerate in which the hydroxyvalerate component is from 0 to 40 mole %, and more preferably up to 30 mole %. Where the hydroxyvalerate component is 20 mole %, $D_{max}$ (the crystalline density) for the copolymer is 1.231 g/cm³ and $D_{min}$ (the non-crystalline density) is 1.176 g/cm³. It is especially preferred that at least 60 wt % of the polyester particles used in this invention should have a density of less than $D_{min}+0.3(D_{max}-D_{max})$ which in the case of the above copolymer containing 20 mole % hydroxyvalerate means that the density of the highly non-crystalline polyester would be less than 1.195 g/cm³.

In addition to accelerating hardening and achievement of tack-resistance, the polyesters also have the advantage of being biodegradable and available from readily available agricultural feedstocks.

The hydroxyalkanoate polyesters are currently relatively expensive and so it is commercially advantageous to use them in combination with film-forming polymers (including copolymers) of the type conventionally used in aqueous paints or varnishes. Such conventional polymers are obtained from monomers which are in turn obtained from petroleum or vegetable oil feedstocks. The conventional polymer may be present as a dispersion of polymer particles or as a solution of polymer in the aqueous vehicle. Preferably polymer which is intended for use in a dispersion should have a minimum film-forming temperature of not more than 40° C. to ensure good film-forming at ambient temperature. Minimum film-forming temperature may be measured by ASTM Test 2354-91. Usually a particulate film-forming polymer will be a copolymer of monomers, one of whose homopolymers has a high minimum film-forming temperature whilst the homopolymer of the other will have a low film-forming temperature. The proportion of co-monomers will then be chosen so as to give a copolymer whose minimum film-forming temperature is not more than 40° C. and preferably above 0° C. Typical monomers whose homopolymers have high minimum film-forming temperatures include carboxylic acids such as acrylic, methacrylic, crotonic or itaconic acids or fumaric or maleic anhydrides or non-acid monomers such as methyl meth-acrylate, vinyl acetate and styrene. Typical monomers whose homopolymers have low minimum film-forming temperatures include ethyl acrylate, 2-ethylhexyl acrylate, methyl acrylate, butyl acrylate and the material commercially available from the Shell Chemical Company under the trade name "Vinyl Versatate" which is believed to be the vinyl ester of a mixture of branched chain acids which contains around 10 carbon atoms. Useful water-soluble film-forming polymers include modifications of the so-called alkyd resins described for example on pages 165 and 170 of the third edition of the book "introduction to Paint Chemistry" by G P A Turner published in 1988 by Chapman and Hall of London where the modification introduces water solubilising moieties into the resin. The contents of these pages from Turner's book are herein incorporated by reference. Other useful water-soluble film-forming polymers include copolymers containing co-monomers of the type listed above in connection with particulate film-forming polymers provided that they contain enough of a salt of a copolymerised carboxylic acid to make the copolymer water-soluble. Examples of such copolymers are described in detail in European Patent Specification EP 0 425 825A, the contents of which are herein incorporated by reference.

To make a coating composition (other than the simplest of varnishes), an aqueous dispersion of hydroxyalkanoate polyester particles optionally together with dispersed or dissolved conventional film-forming polymer is mixed with a dispersion (known as a "millbase") of other ingredients such as pigments (usually titanium dioxide and optionally non-white pigments or dyes), extenders such as clays and chalks and matting agents such as silica if a non-gloss finish is required. The coating compositions may also contain other ingredients such as fungicides, anti-foaming agents and anti-skinning agents.

Paints and varnishes according to this invention can be coated on to substrates using conventional tools or techniques or (for experimental purposes) by using a block spreader. They are especially suitable for application to non-fibrous surfaces at ambient temperatures.

The invention will now be illustrated by the following Examples of which A and B are comparative.

EXAMPLES 1 AND 2

A sample of an aqueous dispersion of a hydroxy alkanoate copolyester consisting of approximately 80 mole % 3-hydroxybutrate and 20 mole % 3-hydroxyvalerate having a solids content of 9.1% was concentrated to 35% solids on a rotary evaporator and mixed 90:10 by weight with an aqueous dispersion of a conventional acrylic film-forming copolymer. 67 wt % of the polyester particles had a density of below 1.18 g/cm$^3$.

The resulting blend was then mixed with a titanium dioxide white millbase to give conventional silk (Example 1) and matt (Example 2) paint formulations. The paints were coated onto various substrates (as specified in Tables 1 and 2) using a block spreader or brush and allowed to dry for specified times at 20° C. The dried coatings were subjected to scratch resistance tests to assess their hardness, to blocking and thermoplasticity tests to assess their tack resistance and to a water spot test which assesses water-resistance and also indicates the extent to which the surface of the coating has been modified by the presumed physical crosslinking attributable to crystallisation. The results are shown in Tables 1 and 2.

Comparative Examples A and B

For comparison, the same tests were repeated on paints of the same formulation except that the hydroxyalkanoate copolyester was replaced by the same weight of the acrylic polymer. Again the results are shown on Tables 1 and 2.

TABLE 1

SILK FORMULATIONS

| TEST | SUBSTRATES | EXAMPLE 1 (WITH POLYESTER) | COMPARATIVE EXAMPLE A (WITHOUT POLYESTER) |
|---|---|---|---|
| Scratch Resistance | "Leneta" paper | Hard | Soft |
| Thermo-plasticity at 70° C. | Undercoated Steel | OK | Marked and wool stuck |
| Blocking 24 h | Undercoated Wood | OK | Stuck: damaged |
| 1 wk | | OK | Slight sticking visible damage |
| Water Spot | "Leneta" paper | OK | Marked |

TABLE 2

MATT FORMULATIONS

| TEST | SUBSTRATES | EXAMPLE 2 WITH POLYESTER | COMPARATIVE EXAMPLE B WITHOUT POLYESTER |
|---|---|---|---|
| Scratch Resistance | "Leneta" paper | Hard | Soft |

Substrates:

"Leneta" paper is a poly- (vinyl chloride) coated paper available from the Leneta Company of Ho-Ho-Kus, N.J. USA and it is designed specially for use in testing paints. The paper is coated with paint using the block spreader and the coating is allowed to dry for 24 hours prior to conducting the tests.

A conventionally primed steel panel was used in the thermoplasticity test. The test coatings were applied using a brush and then allowed to dry for 24 hours. A lambswool pad was placed on the dried coating and soaked with water. A 250 g weight was laid on the pad and the assembly placed in an oven and heated to 70° C. to simulate a domestic central heating radiator. After 1 hour, the assembly was removed from the oven and allowed to cool to room temperature. The pad was then pulled from the panel and the panel was examined for marks.

The Undercoated Wood was first primed with a standard acrylic wood primer. Using a brush, pairs of samples of primed wood were each coated with first and second coatings of the test paints. The first coating was allowed to dry for 24 hours and then the second coating was applied and allowed to dry for either 24 hours or one week. Then a pair of the coated surfaces were placed against each other under a 5 kg load for 24 hours followed by their separation.

The Water Spot Test was performed as follows:
A 1 ml drop of tap water was applied to a coating of the paint under test and covered with a watch glass. The paint under test had been applied to "Leneta" paper and allowed to dry for 24 hours. The drop was removed after 2 hours and the coating was examined for disfiguration.

What is claimed is:

1. An aqueous, film-forming coating composition comprising polyhydroxyalkanoate copolymer polyester particles, wherein at least 60% of the polyester particles have a density of less than 102% $D_{min}$, $D_{min}$ being the lowest density obtainable by the polyester, wherein the aqueous polyhydroxyalkanoate particle composition forms a non-crystalline water-resistant film at ambient temperatures.

2. The composition of claim 1 wherein the polyhydroxyalkanoate polyester comprises a copolymer of between 60 and less than 100 mole % 3-hydroxybutyrate and between greater than 0 and 40 mole % 3-hydroxyvalerate.

3. The composition of claim 1 further comprising other film-forming polymers.

4. The composition of claim 3 wherein the film-forming polymers are obtained from monomers obtained from petroleum or vegetable oil feedstocks and which are present in an amount of up to 95 wt % of the combined weights of the film-forming polymer and the polyhydroxyalkanoate copolymer polyester.

5. The composition of claim 1 further comprising a copolymer which comprises monomers capable of forming homopolymers having high minimum film-forming temperatures and monomers capable of forming homopolymers having low minimum film-forming temperatures.

6. The composition of claim 5 wherein the monomers capable of forming homopolymers having high film-forming temperatures are selected from the group consisting at carboxylic acids, non-acidic monomers, fumaric anhydrides, and maleic anhydrides.

7. The composition of claim 5 wherein the monomers capable of forming homopolymers having low film-forming temperatures are selected from the group consisting of ethyl acrylate, 2-ethyl acrylate, methyl acrylate, butyl acrylate, and vinyl esters of branched chain acids.

8. The composition of claim 1 further comprising a pigment.

9. A method of coating a structure comprising applying an aqueous film-forming coating composition comprising a polyhydroxyalkanoate copolymer polyester particles, wherein at least 60% of the polyester particles have a density of less than 102% $D_{min}$, $D_{min}$ being the lowest density obtainable by the polyester, wherein the aqueous polyhydroxyalkanoate copolymer polyester particle composition forms a non-crystalline water-resistant film at ambient temperatures.

10. The method of claim 9 wherein the polyhydroxyalkanoate polyester comprises a copolymer of between 60 and about 100 mole % 3-hydroxybutyrate and between about 0 and 40 mole % 3-hydroxyvalerate.

11. The method of claim 9 wherein the coating composition further comprises a copolymer which comprises monomers capable of forming homopolymers having high minimum film-forming temperatures and monomers capable of forming homopolymers having low minimum film-forming temperatures.

12. The method of claim 11 wherein the monomers capable of forming homopolymers having high film-forming temperatures are selected from the group consisting of carboxylic acids, non-acidic monomers, fumaric anhydrides, and maleic anhydrides.

13. The method of claim 11 wherein the monomers capable of forming homopolymers having low film-forming temperatures are selected from the group consisting of ethyl acrylate, 2-ethyl acrylate, methyl acrylate, butyl acrylate, and vinyl esters of branched chain acids.

14. The method of claim 9 wherein the composition further comprises film-forming polymers comprising monomers obtained from petroleum or vegetable oil feedstocks and which are present in an amount of up to 95 wt % of the combined weights of the film-forming polymer and the hydroxyalkanoate polyester, and the composition is applied as a paint or varnish.

15. The method of claim 14 wherein the coating is applied to surfaces found on buildings or vehicles, their fittings or furnishings, or on metal or plastic containers.

* * * * *